Feb. 14, 1928.

G. BUDREAU

DRAFT CONNECTION

Original Filed June 29, 1926    2 Sheets-Sheet 1

1,659,016

Witnesses:
Philip Gutwein, Jr.
Wm. E. Vollmer

Inventor:
George Budreau,
By Milo B. Stevens & Co.
Attorneys.

Feb. 14, 1928. 1,659,016
G. BUDREAU
DRAFT CONNECTION
Original Filed June 29, 1926 2 Sheets-Sheet 2

Witnesses:
Philip Gutwein Jr.
Wm. E. Vollmer.

Inventor:
George Budreau,
By Milo B. Stevens & Co.
Attorneys.

Patented Feb. 14, 1928.

1,659,046

UNITED STATES PATENT OFFICE.

GEORGE BUDREAU, OF FRANCESVILLE, INDIANA, ASSIGNOR TO INTERNATIONAL HARVESTER COMPANY, A CORPORATION OF NEW JERSEY.

DRAFT CONNECTION.

Application filed June 29, 1926, Serial No. 119,377. Renewed August 31, 1927.

This invention relates to draft connections as applied to propelling units for the drawing of work-vehicles, and more particularly to appliances employed for the hitching of corn pickers, loading wagons and like service vehicles to a tractor or other propelling unit.

In the usual application of a corn picker or like implement to a tractor, the draft is taken through a wheeled tongue truck built for the implement. In addition to the cost of and impediment formed by the truck, the progress of the picker is more or less unsteady and wandering, due to imperfect connection to the tractor. Also, in cases where sufficient power is had to pull a loading wagon as well, it has been found difficult through usual methods, to aline the wagon with the picker and the tractor on account of incidental side draft and consequent hard pulling on soft ground.

To remedy the above conditions, as well as make for greater efficiency, I have designed my invention with the following objects, viz, 1, to provide a rigid draft connection between the picker—or like vehicle—and the tractor conducive to full control by the operator under all conditions incident to the movement of the picker; 2, to provide a maximum amount of ground clearance between the tractor and the picker; 3, to incorporate means for pulling a loading wagon in parallel relation with the picker without encountering side draft resistance; 4, to provide a take-up adjustment in the propulsion of the loading wagon whereby it may be loaded uniformly; and 5, to construct an appliance of this kind which is of few and sturdy parts, whereby it may be serviceable, cheap to build and durable.

With the above objects in view, and any others which may suggest themselves from the specification and claims to follow, a better understanding of the invention may be had by reference to the accompanying drawings, in which—

Figure 1:
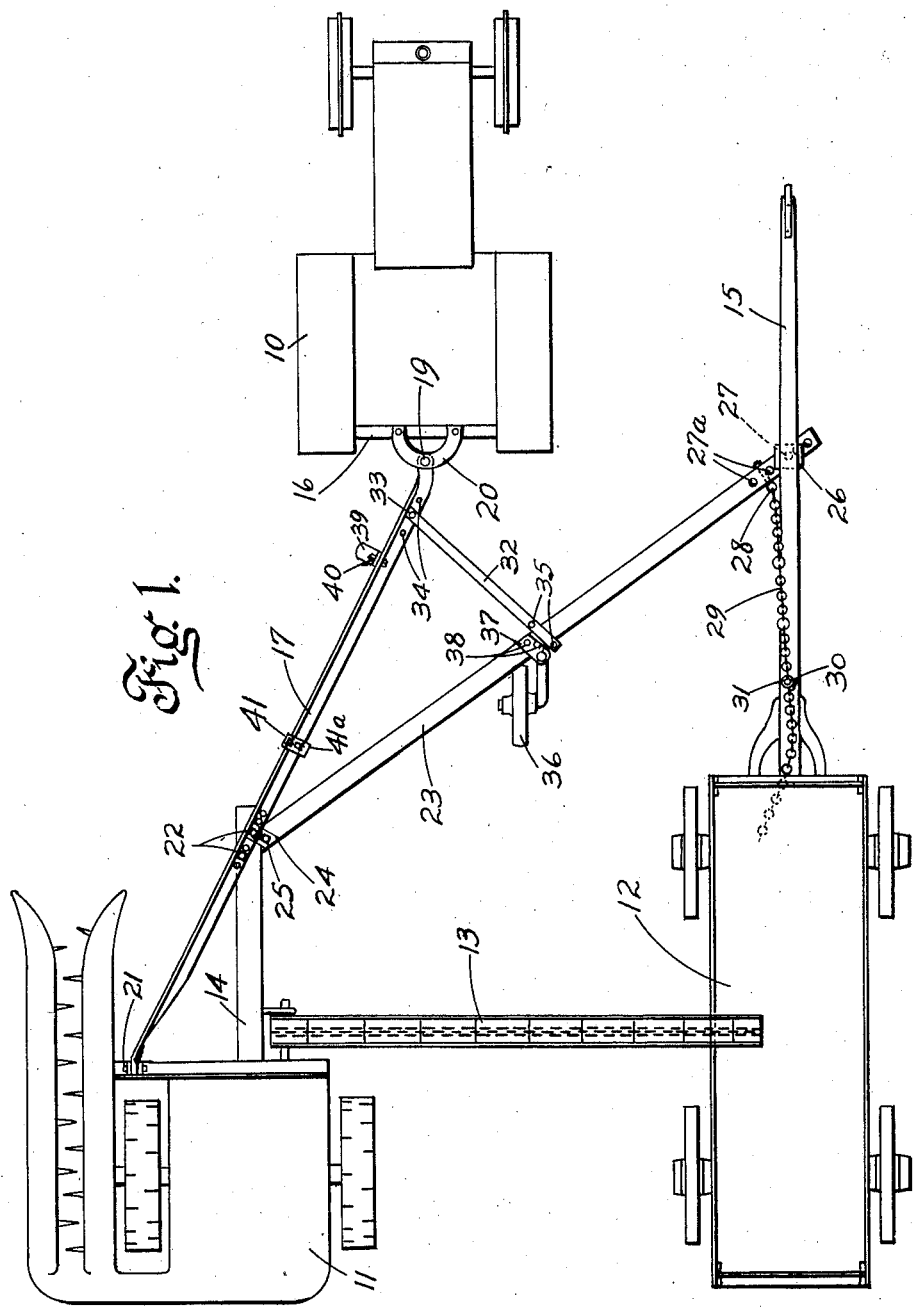
Figure 1 is a plan view of the invention, showing its application.
Figure 2:
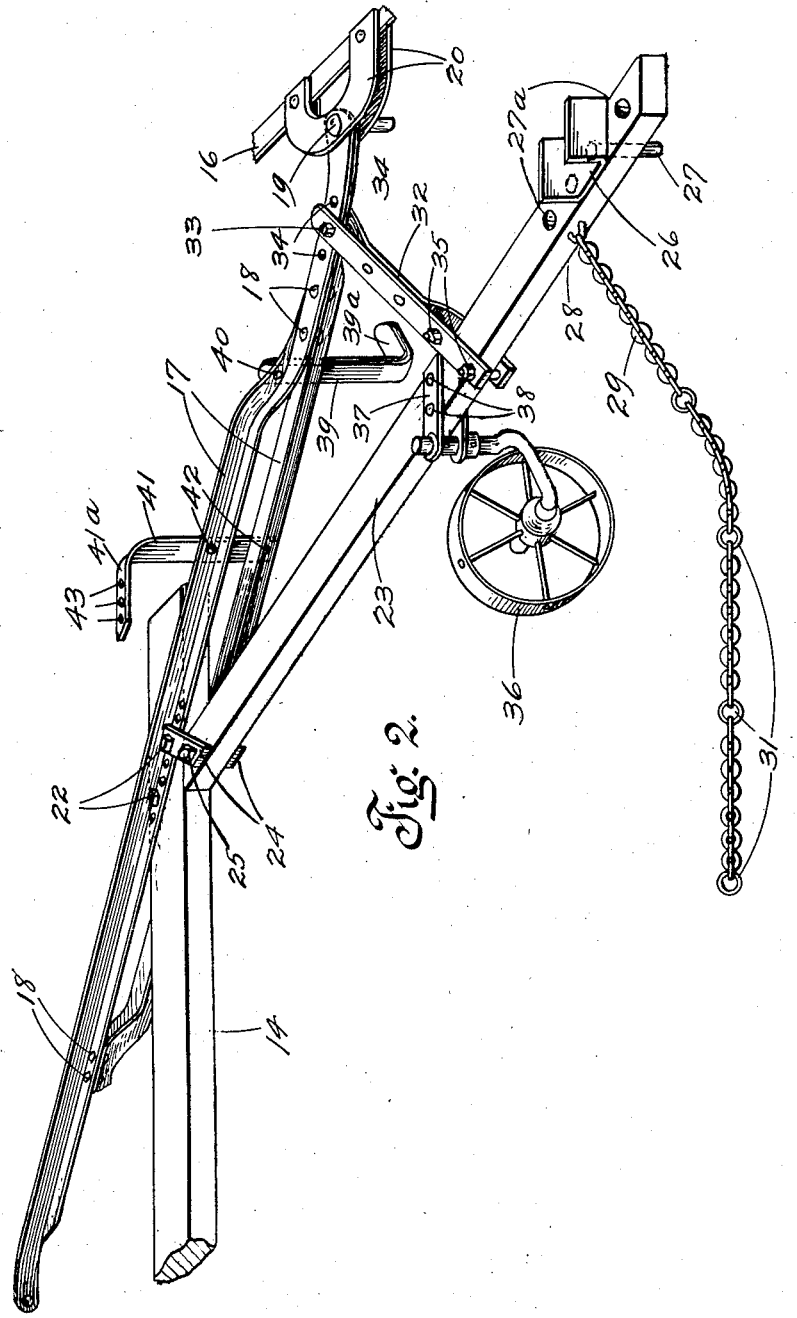
Figure 2 is a perspective view of the appliance, on a larger scale.

Referring specifically to the drawings, 10 represents a tractor preferably employed as the propelling unit, although any other suitable vehicle may be used for the purpose. The corn picker is shown at 11, the loading wagon at 12, and an elevator carried by the picker at 13 to deliver the corn gathered by the picker to the wagon. The picker has a stub tongue 14, the wagon the usual tongue 15, and the tractor a draw bar 16.

The main frame of the novel appliance comprises a pair of superposed angle bars 17, which are connected near the ends by rivets 18, but vertically-spaced intermediately. The angle bar assembley extends from the rear of the tractor to the front of the picker, being connected at its forward end by a king bolt 19 between a pair of U-irons 20 carried by the tractor draw bar 16, and at its rear end by a bolt 21 to the picker frame.

The picker stub tongue 14 extends between the frame bars 17 and, when the picker has been alined to travel in a path parallel to that of the tractor, receives a number of securing bolts 22 to rigidly fasten it to the frame bars.

A lateral compression connection between the picker stub tongue 14 and the wagon tongue 15 is provided in the form of a diagonal beam 23. The rear end of this beam abuts the side of the stub tongue 14 at its junction, with the frame bars and receives straps 24 above and below with bolt and nut assemblies 25 to secure it to said frame bars. The forward end of the beam carries a receptacle plate 26 to seat the wagon tongue 15, said plate having a pin 27 depending into any one of a number of holes 27ª drilled in the beam in longitudinally-spaced relation. The forward section of the beam 23 also carries a shackle-bolt 28 from which a draft chain 29 extends alongside the beam to the wagon. Near the latter the beam carries a bolt 30 upon which is secured any one of a number of eye-links 31 distributed in the chain 29.

A double tie bar 32 is applied to the frontal portions of the diagonal beam 23 and the frame 17, the terminal sections of the tie bar being spread to straddle these parts. A bolt 33 connects the tie bar with the frame 17 by passing through any one of a number of longitudinally-spaced holes 34 therein; and the diagonal beam is firmly clamped between the tie bar sections by the use of lateral bolts 35.

The diagonal beam 23 is supported by a caster wheel 36, whose attaching plates 37 are secured to the beam by bolts 38.

A supporting standard 39 is carried by the frame 17 for use in the position shown when the propelling unit is disconnected. The standard is formed with a foot 39ª and is pivotally connected by a bolt 40 to the upper angle bar of the frame. When the propelling unit has been connected whereby to provide a frontal support for the frame, the standard 39 may be swung up to a position alongside the frame, so as to be out of the way.

An elevated support 41 is fitted to the frame 17 at an intermediate point for the application when desired of a bearing to be used in a power transmission from the tractor to the picker to operate the same. The support is secured to the frame sections by bolts 42, and is formed with a horizontal top bend 41ª perforated at 43 for the necessary attaching bolts.

In the application of the invention, it will be seen that the bolt connection at 19 permits changes in the course of the tractor, the direction of the trailing vehicles changing accordingly. However, the rigid connections of the frame with the picker at 21 and 22 will hold the latter to its course and fully under the control of the propelling unit. Owing to the provision of several bolt holes in the frame sections at 22, it will be seen that the adjustment relative to the stub tongue 14 can be varied until the correct course of the picker is found. The diagonal beam 23 is the leading element for the loading wagon 12, and its position is such that it also forms a spacer for the latter as against the picker by its butt-joint with the stub tongue 14. The connecter 23 is obviously under compression, the tension pull of the element 17 being translated into a push or compression on the connecter 23 for pushing the receiver 12, any bending tendency in the connecter 23 being overcome by the brace 32. The receptacle 26 forms a swiveled seat for the tongue 15, while the chain 29 forms the draft connection. The latter may be varied in length by using different ones of the eye-links 31 to make the attachment, whereby the position of the loading wagon 12 will change in forward or rearward direction relative to the position of the elevator 13. The wagon box may thus be filled at several points, eliminating the necessity of leveling the load from time to time in order to facilitate filling. The tie bar 32 incidentally acts as a drawing-lever upon the diagonal compression beam 23 taking the pull from the direction of the loading wagon 12. By changing the bolt 33 relative to the holes 34, or lossening the bolts 32 to permit the sliding of the tie bar along the beam 23 to another position, various adjustments are effected with respect to the position of the beam to suit ground conditions. Also, lateral adjustments of the receptacle 26 by use of different holes 27ª in the beam will vary the position of the loading wagon as will best suit conditions.

The appliance, as illustrated and described forms a simple, yet sturdy apparatus to draw the trailing vehicles in the proper relation to the propelling unit, and eliminates the need of a wheeled truck for the picker, leaving the ground unobstructed between the tractor and the picker. While the invention has been illustrated in the preferred form, it is obviously capable of various changes and improvements of a minor nature, and it is my intention to include such changes and improvements as coming within the scope and spirit of the appended claims.

I claim:

1. A draft connection from a propelling unit to a work trailer and a receiving wagon, comprising a direct drawing element to the work trailer, a diagonal connection between the trailer and the wagon, and a tie bar connection between the diagonal connection and the said drawing element.

2. A draft connection from a propelling unit to a work trailer and a receiving wagon, comprising a direct drawing element swiveled to the propelling unit and leading to the work trailer, a diagonal connection between the trailer and the wagon, and a tie bar connection between the diagonal connection and the said drawing element.

3. A draft connection from a propelling unit to a work trailer and a receiving wagon, comprising a direct drawing element to the work trailer, lateral adjusting means for the trailer relative to the drawing element, a diagonal connection between the trailer and the wagon, and a tie bar connection between the diagonal connection and the said drawing element.

4. A draft connection from a propelling unit to a work trailer and a receiving wagon, comprising a direct drawing element to the work trailer, a diagonal connection between the trailer and the wagon, lateral adjusting means for the wagon relative to the diagonal connection, and a tie bar connection between the diagonal connection and the said drawing element.

5. A draft connection from a propelling unit to a work trailer and a receiving wagon, comprising a direct drawing element to the work trailer, a diagonal connection between the trailer and the wagon, and a tie bar connection between the diagonal connection and pivoted to the said drawing element.

6. A draft connection from a propelling unit to a work trailer and a receiving wagon, comprising a direct drawing element to the work trailer, a diagonal connection between the trailer and the wagon, and a tie bar connection adjustably attachable along the diagonal connection and leading toward the propelling unit to connect with the said drawing element.

7. A draft connection from a propelling unit to a work trailer and a receiving wagon, comprising a direct drawing element to the work trailer, a diagonal connection between the trailer and the wagon, and a tie bar connection adjustably attachable along the diagonal connection and leading toward the propelling unit to make an adjustable connection along the said drawing element.

8. A draft connection from a propelling unit to a work trailer and a receiving wagon, comprising a direct drawing element to the work trailer, a diagonal connection between the trailer and the wagon, a tie bar connection between the diagonal connection and the said drawing element, and a supporting foot carried by the said drawing element.

9. A draft connection from a propelling unit to a work trailer and a receiving wagon, comprising a direct drawing element to the work trailer, a diagonal connection between the trailer and the wagon, a tie bar connection between the diagonal connection and the said drawing element, and a supporting foot carried by the said drawing element, said supporting foot being foldable alongside the said drawing element.

10. A draft connection from a propelling unit to a work trailer and a receiving wagon, comprising a direct drawing element to the work trailer, a diagonal connection between the trailer and the wagon, a tie bar connection between the diagonal connection and the said drawing element, and a caster ground-wheel support carried by the said diagonal connection.

11. A draft connection for a wagon equipped with a tongue, comprising a propelling beam applied to the said tongue, a receptacle carried by the propelling beam to slidably dispose the said tongue, a draft chain led from the said propelling beam alongside the said tongue, a bolt carried by the latter, and eye-links in the said draft chain selectively applicable to the said bolt whereby to position the wagon nearer to or farther from the propelling beam.

12. A draft connection for a wagon equipped with a tongue, comprising a propelling beam applied to the said tongue, a receptacle swivelly carried by the propelling beam to slidably dispose the said tongue, a draft chain led from the said propelling beam alongside the said tongue, a bolt carried by the latter, and eye-links in the said draft chain selectively applicable to the said bolt whereby to position the wagon nearer to or farther from the propelling beam.

13. A draft connection from a propelling unit to a work trailer having a structural frame and a tongue, comprising, a drawing element swivelly attached to the propelling unit and leading diagonally to the trailer frame whereby to intersect the tongue and form a hypothenuse-brace between the latter and the frame, and means for fastening the drawing element to the frame and to the tongue.

14. A draft connection from a propelling unit to a work trailer and a receiving wagon, comprising a direct drawing element to the work trailer, a diagonal connection between the trailer and the wagon, a tie bar connection between the diagonal connection and the said drawing element, and co-operating means carried by the diagonal connection and the wagon to adjustably vary the relative position of the wagon forwardly or rearwardly.

15. A draft connection from a propelling unit to a work trailer and a receiving wagon, comprising a direct tension draw means between the propelling unit and the work trailer, and a compression connecter from the work trailer and tension draw means to the wagon for leading and pushing the latter.

16. A draft connection from a tractor, having a drawbar, to a trailing implement and a wagon, said draft connection comprising a direct tension draw means from a central point on the tractor drawbar to the implement, and a connecter for the wagon for translating the pull of the direct draw means to a compressional force for causing the said connecter to lead and push the wagon.

17. A draft connection from a tractor, having a drawbar, to a trailing implement and a wagon, said draft connection comprising a direct tension draw means from the tractor drawbar to the implement, and a diagonally disposed connecter for the wagon for translating the pull of the direct draw means to a compressional force for causing said connecter to lead and push the wagon.

In testimony whereof I affix my signature.

GEORGE BUDREAU.